No. 689,965. Patented Dec. 31, 1901.
C. H. HILL & R. R. HOWELL.
AUTOMATIC BAND CUTTER AND FEEDER FOR THRESHING MACHINES.
(Application filed May 13, 1899.)
(No Model.) 6 Sheets—Sheet 1.
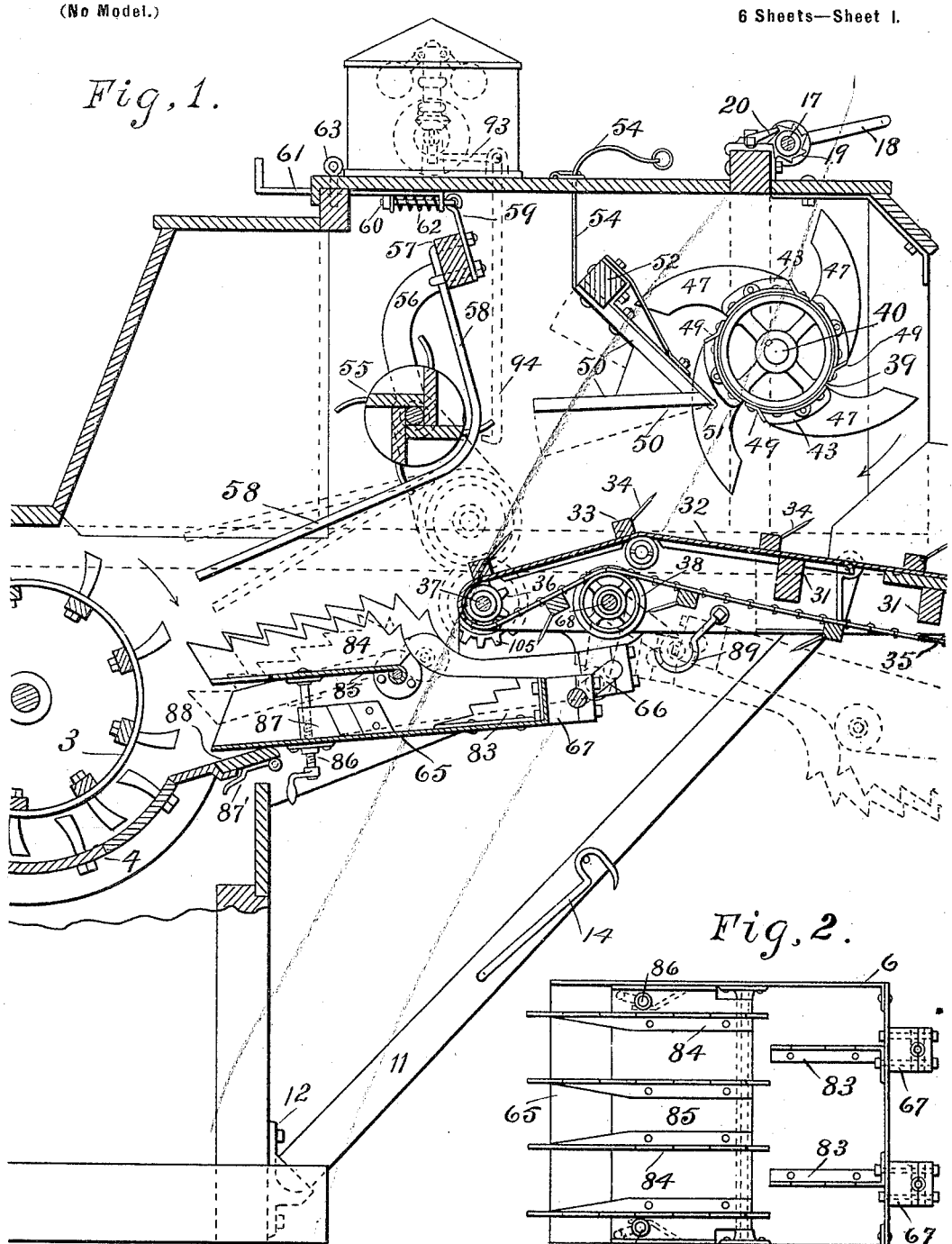
Witnesses
Richard Paul
M. C. Noonan
Inventors,
Chauncy H. Hill.
Robert R Howell
By Paul & Hawley Attorneys.

No. 689,965. Patented Dec. 31, 1901.
C. H. HILL & R. R. HOWELL.
AUTOMATIC BAND CUTTER AND FEEDER FOR THRESHING MACHINES.
(Application filed May 13, 1899.)
(No Model.) 6 Sheets—Sheet 2.
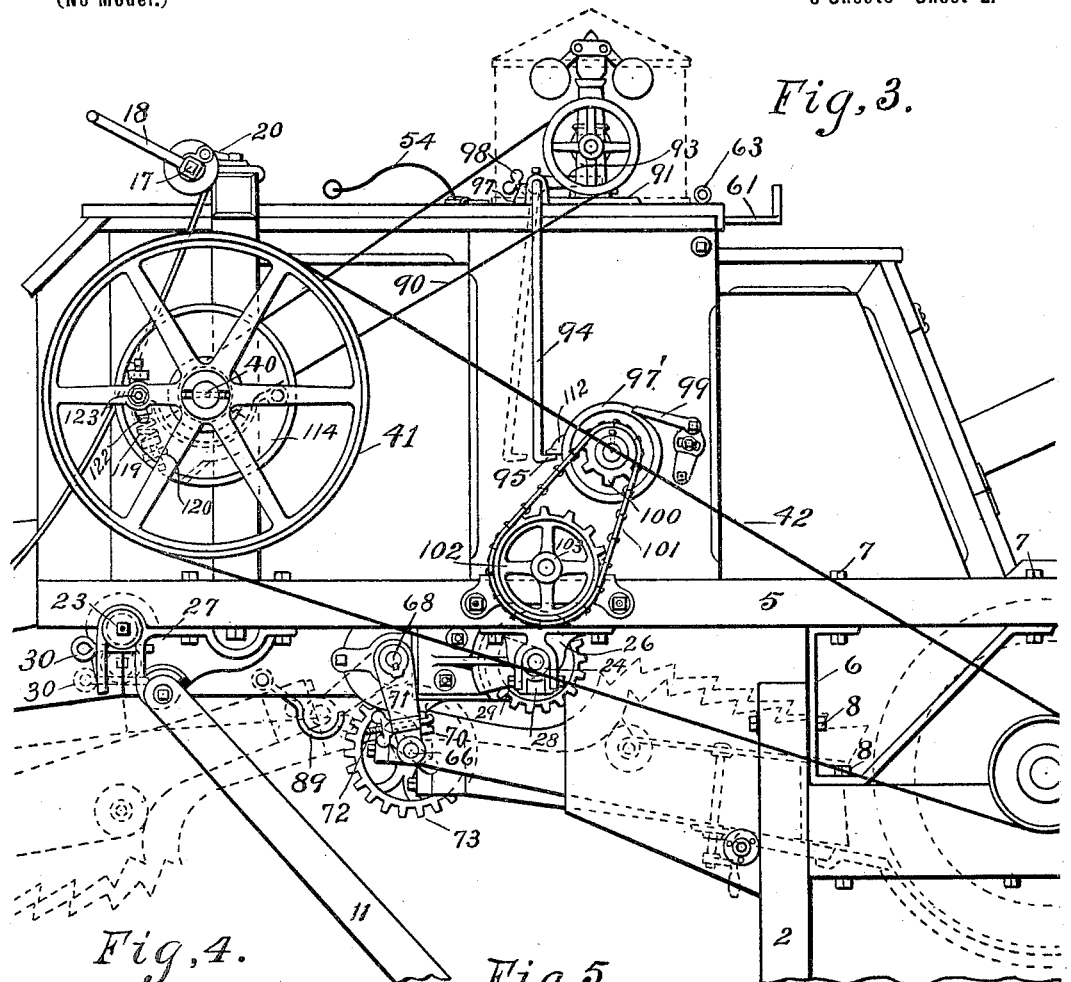
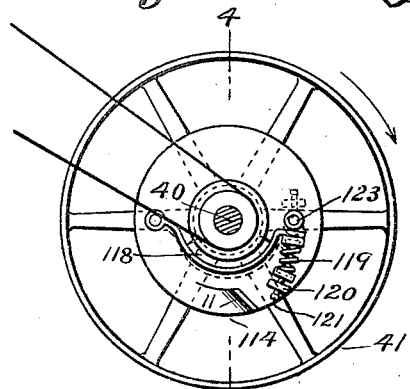
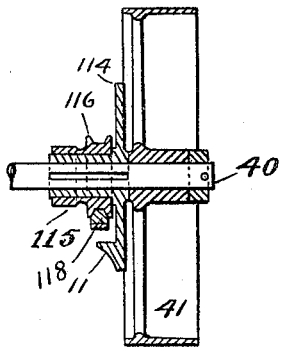
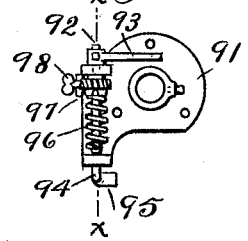
Witnesses
Inventors,
Chauncy H. Hill.
Robert R. Howell.
By Paul & Hawley Attorneys.

No. 689,965. Patented Dec. 31, 1901.
C. H. HILL & R. R. HOWELL.
AUTOMATIC BAND CUTTER AND FEEDER FOR THRESHING MACHINES.
(Application filed May 13, 1899.)
(No Model.) 6 Sheets—Sheet 3.
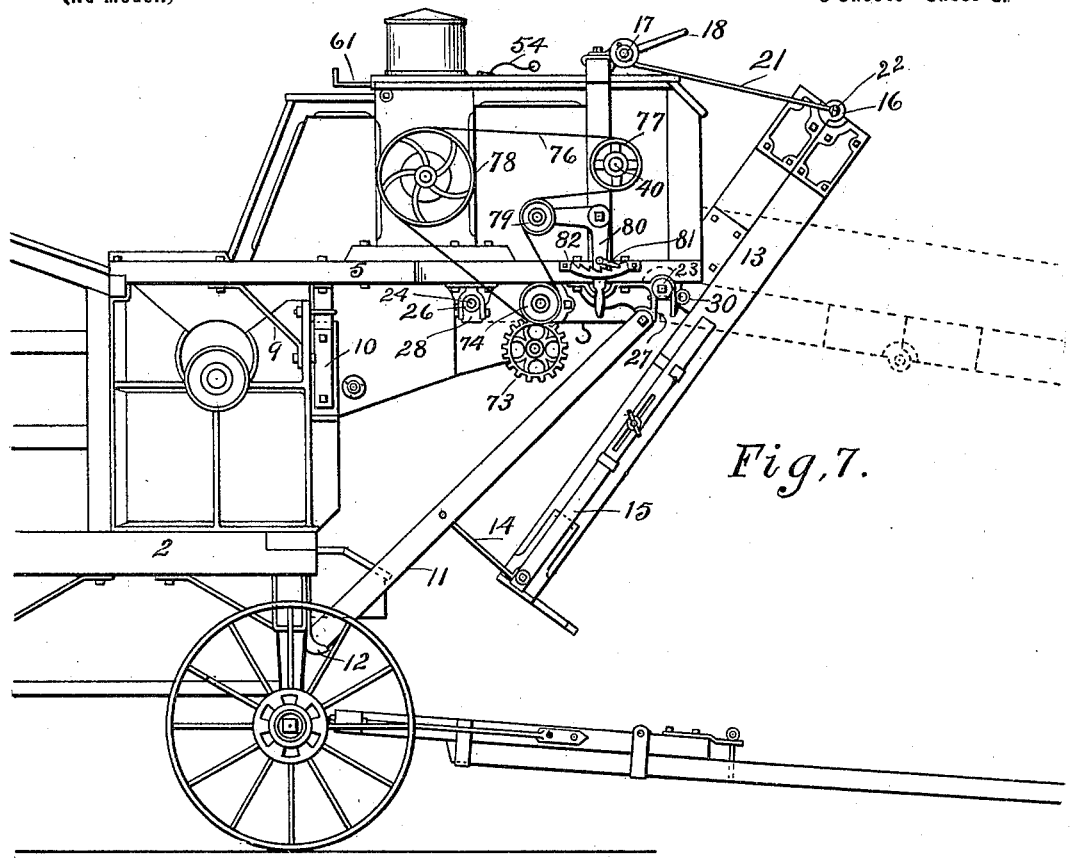
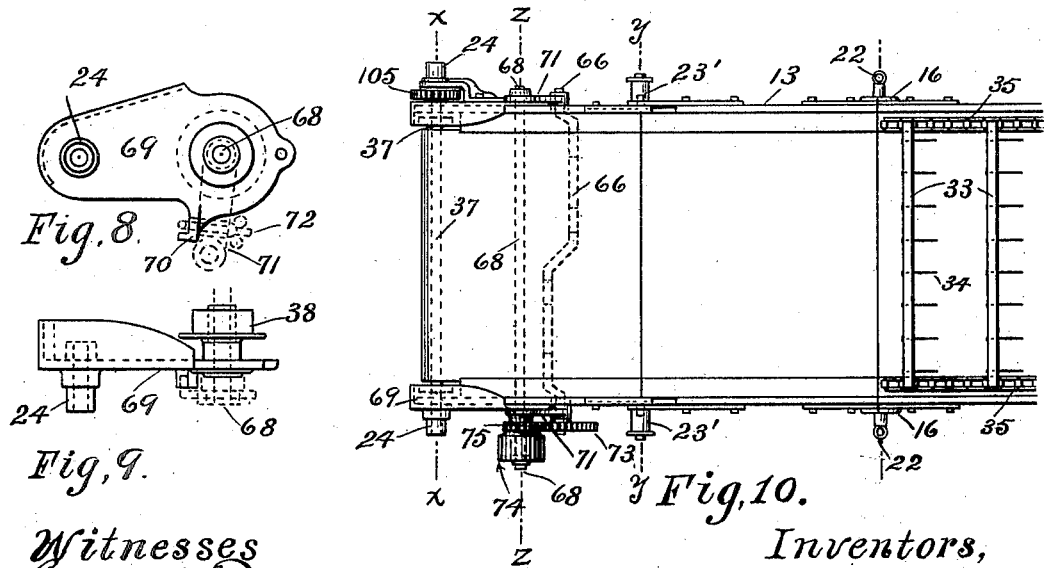
Witnesses
Richard Paul
M. C. Noonan
Inventors,
Chauncy H. Hill
Robert R. Howell
By Paul & Hawley Attorneys.

No. 689,965. Patented Dec. 31, 1901.
C. H. HILL & R. R. HOWELL.
AUTOMATIC BAND CUTTER AND FEEDER FOR THRESHING MACHINES.
(Application filed May 13, 1899.)
(No Model.) 6 Sheets—Sheet 4.
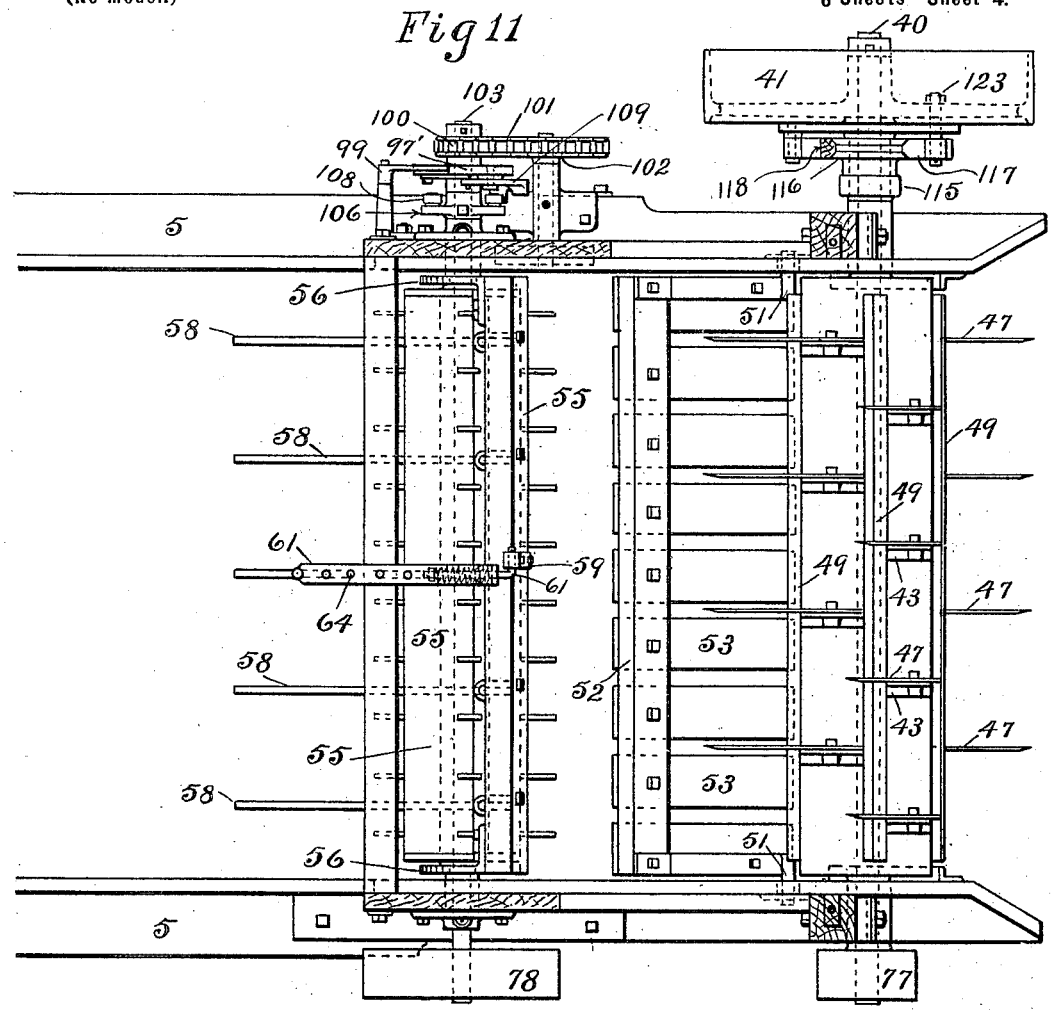
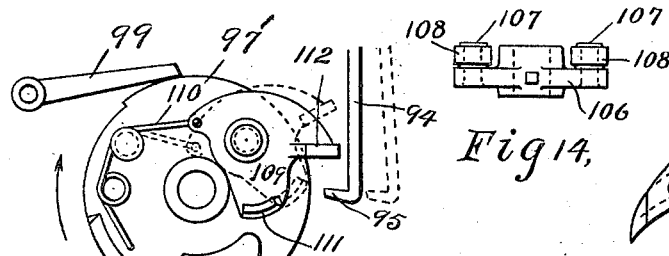
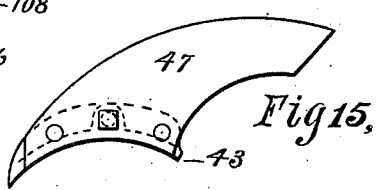
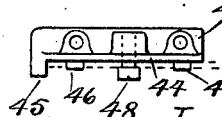
Witnesses
Inventors
Chauncy H. Hill
Robert R. Howell
By Paul & Hawley Attorneys.

No. 689,965. Patented Dec. 31, 1901.
C. H. HILL & R. R. HOWELL.
AUTOMATIC BAND CUTTER AND FEEDER FOR THRESHING MACHINES.
(Application filed May 13, 1899.)
(No Model.) 6 Sheets—Sheet 5.
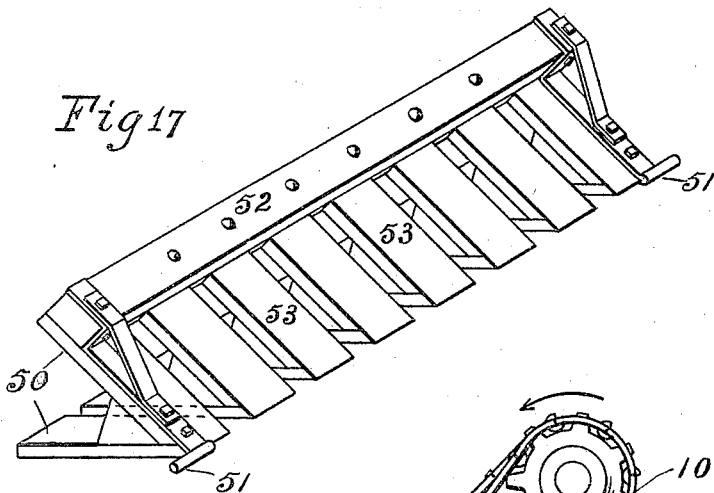
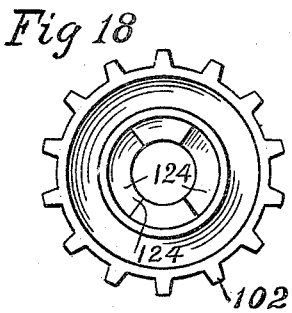
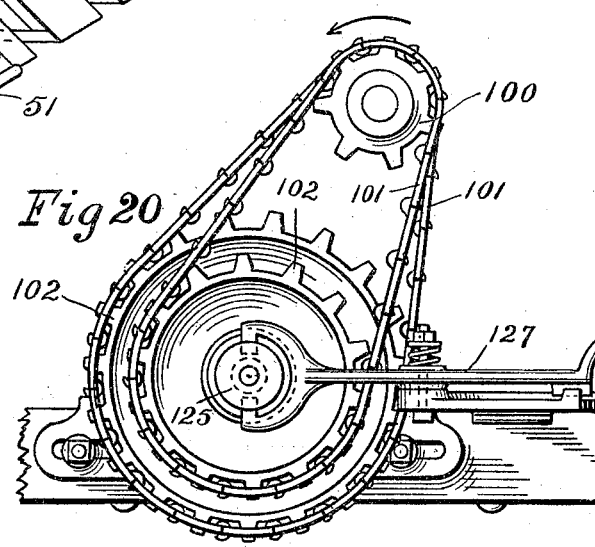
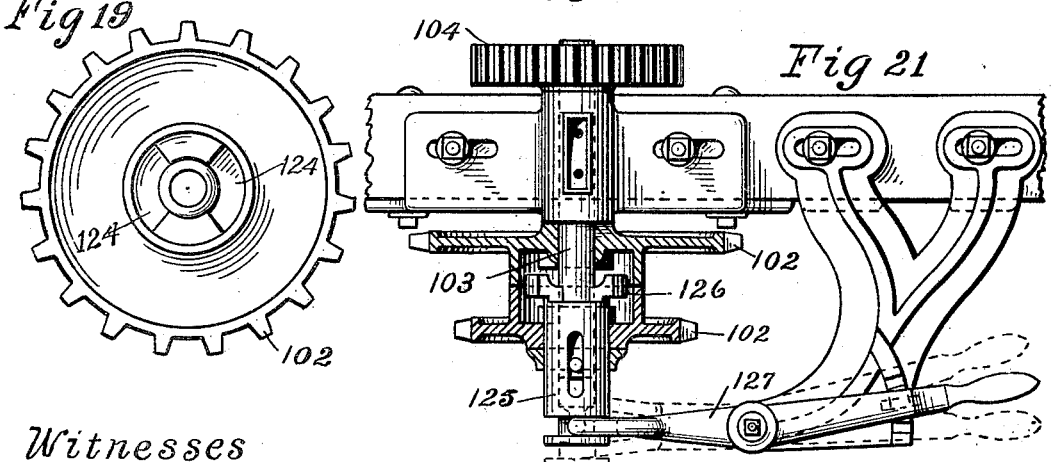
Witnesses
Richard Paul
M. C. Noonan
Inventors
Chauncy H. Hill.
Robert R. Howell.
By Paul & Hawley Attorneys No. 689,965. Patented Dec. 31, 1901.
C. H. HILL & R. R. HOWELL.
AUTOMATIC BAND CUTTER AND FEEDER FOR THRESHING MACHINES.
(Application filed May 13, 1899.)
(No Model.) 6 Sheets—Sheet 6.
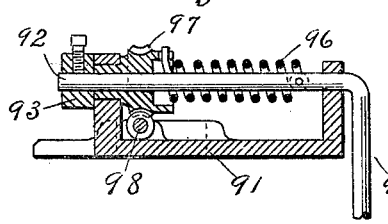
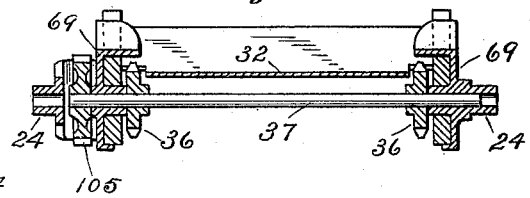
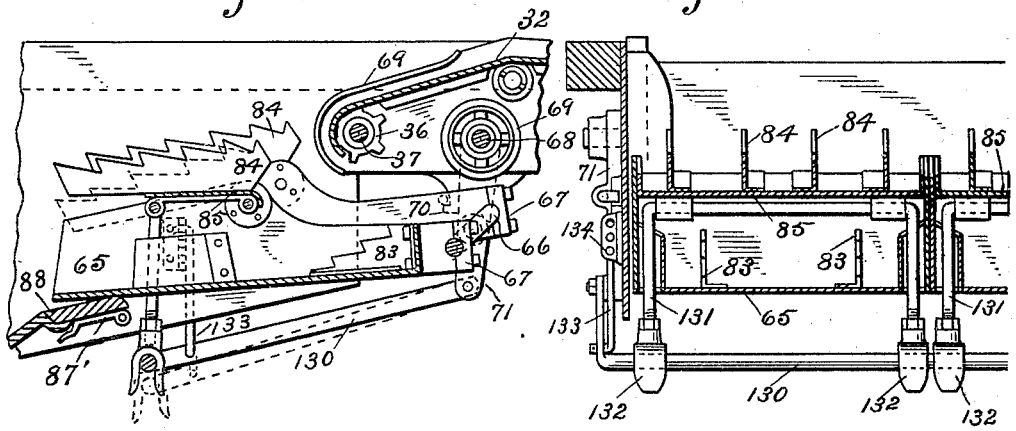
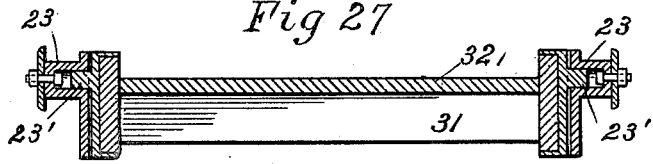
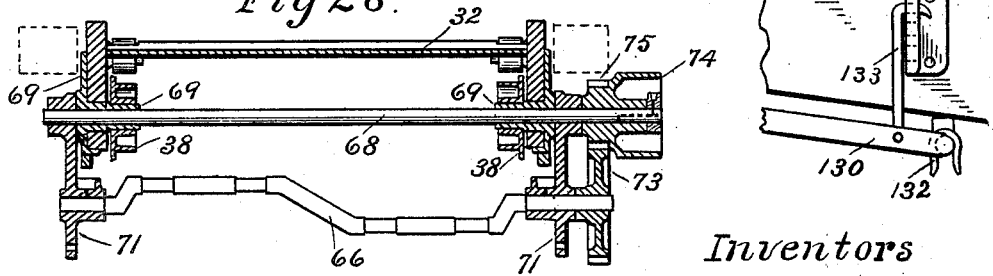
Inventors
Robert R. Howell
Chauncy H. Hill
By Paul & Hawley Attorneys
Witnesses

UNITED STATES PATENT OFFICE.

CHAUNCY H. HILL AND ROBERT R. HOWELL, OF MINNEAPOLIS, MINNESOTA.

AUTOMATIC BAND-CUTTER AND FEEDER FOR THRESHING-MACHINES.

SPECIFICATION forming part of Letters Patent No. 689,965, dated December 31, 1901.

Application filed May 13, 1899. Serial No. 716,677. (No model.)

*To all whom it may concern:*

Be it known that we, CHAUNCY H. HILL and ROBERT R. HOWELL, of Minneapolis, county of Hennepin, State of Minnesota, have invented certain Improvements in Automatic Band-Cutters and Feeders for Threshing-Machines, of which the following is a specification.

This invention relates to improvements in devices designed for the automatic cutting of the bands of bundles of grain and feeding the grain to threshing-machines; and the objects we have in view are to provide an improved construction of knife-cylinder and knives, an improved knife-guard, improved means for supporting and operating the bundle-carrier, improved fenders in connection with a rotating beater, improved vibrating pans carrying racks by which the grain is moved forward from the carrier to the cylinder of the threshing-machine, improved means for adjusting the racks carried by said pans, and an improved governing device and means for operating the same.

Other objects of the invention will appear from the following detailed description, taken in connection with the accompanying drawings, in which—

Figure 1 is a longitudinal section of a portion of a threshing-machine having our invention applied thereto. Fig. 2 is a plan view of one of the vibrating pans. Fig. 3 is a side elevation showing substantially the same part of the machine that is shown in Fig. 1, but looking toward the opposite side of the machine. Figs. 4 and 5 are respectively a side elevation and a detailed section, on line 4 4 of Fig. 4, of the belt-pulley and regulator arranged in connection therewith. Fig. 6 is a detail of part of the governor. Fig. 7 is a side elevation of a portion of the machine looking in the opposite direction from that in which the view shown in Fig. 3 is taken. Figs. 8 and 9 are details of the means for supporting the crank-shaft and vibrating pans. Fig. 10 is a plan view of a portion of the carrier and parts connected therewith. Fig. 11 is a plan view showing the knife-cylinder and knives, the knife-guard, the beater, and the fenders arranged in connection with the beater. Figs. 12, 13, and 14 are details illustrating the clutch and its operation. Figs. 15 and 16 are details showing one of the knives and the bracket for securing said knife to the knife-cylinder. Fig. 17 is a detail showing the knife-guard. Figs. 18, 19, 20, and 21 are details showing a two-speed device that may be used in connection with the beater-shaft. Fig. 22 is an enlarged detail of the spring-rod that is operated by the speed-governor. Fig. 23 is a partial longitudinal section, Fig. 24 a partial transverse section, and Fig. 25 a detail elevation, showing a modified arrangement of the pans and means for operating them. Fig. 26 is a detail section on the line *x x* of Fig. 10. Fig. 27 is a detail section on line *y y* of Fig. 10. Fig. 28 is a detail section on line *z z* of Fig. 10.

In the drawings, 2 represents the frame of a threshing-machine, which may be of any ordinary or preferred construction and which is provided with the usual threshing-cylinder 3 and concave 4. The framework at the forward or feed end of the machine may be constructed of wood, as illustrated in Fig. 3 of the drawings, or it may be a suitable metallic construction, as illustrated in Fig. 7 of the drawings.

Our band-cutter and feeder is adapted for use in connection both with the machines that use the wooden frame for supporting the threshing-cylinder and the devices that coöperate therewith or with those that use a metallic frame for this purpose.

The main frame 5 of our band-cutter and feeder is adapted to be secured to that portion of the frame of the threshing-machine that ordinarily supports the threshing-cylinder, its concave, and feed-board. In Fig. 3 of the drawings we have shown the frame 5 provided with a suitable metallic auxiliary frame 6, that is secured to said frame 5 by suitable bolts 7 and to the frame of the threshing-machine by suitable bolts 8. In Fig. 7 we have shown suitable braces 9 and 10, that are bolted to the frame of the threshing-machine and also to the frame 5, and in both instances we have shown a pivoted brace 11 connected to the under side of the frame 5 or to any suitable attachment thereof and with its lower end supported upon a step 12 upon the frame of the threshing-machine.

The means we have shown we consider desirable and satisfactory for the purpose of securing the band-cutter and feeder to a threshing-machine; but we do not limit ourselves to any particular devices for this purpose, as it will be obvious that any other suitable means may be employed for connecting the band-cutter and feeder to the threshing-machine frame and supporting it thereon.

The carrier-frame 13 (see Figs. 7 and 10) is made separate and independent of the main frame 5, and it is provided with two hinges or joints, permitting it to be folded up into the position shown in Fig. 7, and when it is in this position its lower end is supported upon the brace 11 by means of a suitable hook 14. The carrier-frame is also provided with a suitable leg 15 at each side at its outer end, which may be folded up, as shown in Fig. 7, or may be turned down into a vertical position to support the outer end of the carrier-frame in a manner well understood in this class of devices. The outer section of the carrier-frame is connected to the next section, at each side thereof, by means of a suitable hinge 16, (see Figs. 7 and 10,) and we also prefer to provide upon the top of the main frame 5 a windlass 17, having a suitable operating-handle 18 and ratchet 19, controlled by a suitable pawl 20, and suitable ropes 21, arranged upon this windlass, are connected to studs 22, located at the axes of the hinges 16. By this means the ends of the sections of the carrier-frame may be raised into the position shown by full lines in Fig. 7 when the machine is to be moved, or said frame may be let down into position shown by dotted lines in the same figure when it is to be used for threshing. The second or intermediate section of the carrier-frame is connected to the inner section by a hinge-joint, permitting said second section to be turned up into position shown in Fig. 7 or let down; but the third or inner section is secured directly under the main frame 5, as shown in Figs. 1, 3, and 7. This section of the carrier-frame is provided with the studs 23' and 24. The middle section of the carrier-frame has a stud 23, and this stud has a socket or recess in its inner end, and the stud 23' projects into this socket. The two studs form the hinge between the two sections of the carrier-frame. The frame 5 is provided with suitable brackets 26 and 27. (See Figs. 3 and 7.) These brackets are provided with inverted yokes or U-shaped portions, that receive the studs 23' and 24 of the carrier-frame and form bearings therefor. The studs 24 are hollow, and through one of them passes a shaft, as hereinafter described. The studs 24 are secured in position in the brackets 26 by means of blocks 28 and suitable bolts 29, (see Fig. 3,) while the studs 23 are secured in position by means of adjustable pins 30. By this means the studs 23 and the carrier-frame may be adjusted upon the brackets 27 and held either in the position shown by full lines in Fig. 3 or in the position shown by dotted lines in the same figure, and by the same means the carrier may be raised or lowered, whereby the knives hereinafter described may be made to cut a greater or less distance into the bundles as they are passed under the knife-cylinder. The carrier-frame is provided with suitable transverse bars 31, (see Fig. 1,) and over these is arranged an apron 32, of sheet-steel or other suitable material. We also provide the series of carrier-bars 33, having spikes 34 extending diagonally through them and projecting backward therefrom, and these bars are secured to and moved by the carrier-chains 33. These chains pass around the sprocket-wheels 36 upon the shaft 37, that is arranged at the inner end of the carrier-frame and mounted therein, and one end of the shaft 37 may project into or through one of the studs 24. (See Fig. 26.) The backwardly-projecting spikes 34 hold the bundles as they are passing under the knives and prevent them from being thrown forward by the knives as the bundles pass under the knife-cylinder. The driving-shaft 37 for the carrier is operated from the beater-shaft by means hereinafter described. Suitable idler-pulleys 38 (see Figs. 1, 9, and 28) are arranged at opposite sides of the carrier-frame upon a shaft 68, and over these pulleys the chains 35 pass, so that the carrier-bars and spikes are held up out of contact with the reciprocating pans hereinafter described.

The knife-cylinder is arranged over the inner end or portion of the carrier, as shown in Fig. 1. This is preferably a sheet-steel cylinder 39, mounted upon a driving-shaft 40, and this shaft is provided with a driving-pulley 41, mounted loosely thereon, to which power is applied by means of a belt 42, running from a pulley on the shaft of the threshing-cylinder. (See Fig. 3.) The knife-cylinder 39 has secured to its outer surface a number of brackets 43, (see Fig. 16,) these brackets being preferably secured by being bolted or riveted upon the outer surface of the cylinder. Each of the brackets is provided with a vertical flange 44 and with a laterally-projecting lug or shield 45 and also, preferably, with the laterally-projecting studs 46. The knife-blades 47 are preferably of the curved form, (shown in Figs. 1 and 15,) and they are secured to the side of the brackets 43. (See Figs. 15 and 16.) The heel of the knife preferably bears against the lug 45, and the studs 46 project into holes in the knife. A cap-screw 48 is provided for clamping the knife in position upon the bracket. We also prefer to provide upon the knife-cylinder a series of shields consisting of inclined strips 49, that run lengthwise of the cylinder, being bolted or riveted to its outer surface, and these strips project above the ends of the brackets and prevent the straw from catching on the brackets. They also serve to hold the straw out from the cylinder and prevent its winding thereon and assist in throwing the straw off from the knife-cylinder. The knife-cylinder rotates rapidly in the direction of the arrow in Fig. 1, and as the bundles are brought under the cylinder by the carrier the knives are forced into the bundle, and they cut the bands and at the same time spread open the bundles to a considerable extent.

Arranged just inside of the knife-cylinder is a pivoted knife-guard 50. (See Figs. 1, 11, and 17.) This guard consists of a triangular frame provided with journals 51, by means of which it is mounted in the frame of the machine, and it has at its upper side a transverse bar 52, and from this bar there extend a series of A-shaped parts 53, arranged with spaces between them, which spaces extend clear through the guard, and through these spaces the knives pass as the knife-cylinder is rotated. (See Fig. 1.) The knife-guard being pivoted at the apex of the triangle, which is the point nearest the knife-cylinder, the weight of the frame rests upon the bundles of grain as they pass under it, and the guard not only serves to clear the grain from the knives, but also assists in spreading and holding down the grain, so as to have it properly guided to the threshing-cylinder and also prevent the knives from throwing the bundles. At the same time the knife-guard will be raised when an excessive amount of grain passes under it, and it may be fastened at any desired point by any suitable means, as by a strap 54, (see Fig. 1,) adapted to be suitably held by any desired means connected to the frame of the machine. After the grain passes under the knife-guard 50 and at about the time it leaves the carrier it passes under a beater 55, of any usual or preferred construction. This beater assists in distributing and moving the grain onward toward the threshing-cylinder. Mounted loosely upon the shaft-boxes of the beater 55 are the brackets 56, (see Figs. 1 and 11,) and secured to the upper ends of these brackets is the transverse bar or beam 57. A series of curved rods forming fenders 58 are secured to the bar 57 and pass down and under the beater 55. (See Fig. 1.) These fenders extend nearly to the threshing-cylinder and serve to hold the grain down, to direct it into the throat of the cylinder, and prevent it from being thrown upward by the rotating beater 55. We also provide means for adjusting the fenders 58 and also permitting them to yield when necessary to permit the passage of grain under them. For this purpose we prefer to provide a strap 59, connected to the cross-bar 57, and this strap is pivoted to a rod 60, which passes through the end of an adjustable bar 61, a spring 62 being arranged on the rod 60 and in engagement with the end of the adjusting-bar 61. (See Fig. 1.) The adjusting-bar 61 extends outside the frame of the machine, and it is adapted to be moved to any desired position, and being provided with a number of holes 64, into any one of which a pin 63 may be inserted, the bar may be held in any position in which it is placed. By this means the lower ends of the fenders 58 may be raised or lowered, and at the same time the fenders are capable of yielding when this is made necessary by the pressure of the grain upon them. As before stated, there are two reciprocating pans 65, that are arranged between the carrier and the feed-board of the threshing-machine. These pans are shown clearly in Figs. 1, 2, 23, and 24 of the drawings. A shaft 66, provided with oppositely-arranged cranks, (see Fig. 28,) supports the outer ends of the pans, and by means of this shaft the pans are oppositely reciprocated and balance each other. The pans are provided with bearings 67, by means of which they are connected to the cranks. (See Figs. 2 and 23.) A shaft 68 is mounted in the carrier-frame in a position nearly over the normal position of the crank-shaft 66. The idler-pulleys 38, before referred to, are arranged to turn freely upon studs on the casting 69 about this shaft, one of these pulleys being shown in detail in Fig. 9 of the drawings, in which figure the position of the shaft is represented in dotted lines. (See also Fig. 28.) The casting 69 (see Figs. 8, 9, 10, and 28) is secured at each side upon the end of the carrier-frame, and this casting supports or has secured to it the lugs 24, hereinbefore referred to, and this casting forms a bearing at each side of the carrier for the shaft 37, which constitutes the driving-shaft for the carrier. The casting 69 extends along each side of the carrier-frame, as shown in Fig. 10, and covers the chain of the carrier and keeps it on its sprocket-wheels and also forms the bearings for the shaft 68. (See Fig. 28.) This casting is provided with the depending lugs 70. (See Figs. 3 and 8.) Rigidly attached upon each end of the shaft 68 is a swinging bracket 71, and in the lower end of these brackets the crank-shaft 66 is mounted. (See Fig. 28.) Hook-bolts 72 are provided in connection with each of these brackets, (see Figs. 3 and 8,) and by this means said brackets may be secured rigidly to the depending lugs 70 of the casting 69. (See Fig. 8.) The crank-shaft 66 is provided at one end with a suitable gear 73, (see Figs. 3, 7, 10, and 28,) and there is mounted upon the end of the shaft 68 a pulley 74, having a pinion 75 secured thereto or made integral therewith. The pinion 75 meshes with the gear 73, and the pulley 74 and the pinion 75 turn freely upon the shaft 68. As the brackets 71 swing from the shaft 68, the gear 73 will always remain in engagement with the pinion 75. The pulley 74 is driven by means of a belt 76, which is driven from a pulley 77 on the shaft of the knife-cylinder 39. This belt also passes around a pulley 78 on the shaft of the beater 55 and around a tightener-pulley 79, mounted upon a bell-crank lever 80. This lever is provided with a suitable pawl 81, that engages a ratchet 82, by means of which the lever may be held in any desired position. It will be seen, therefore, that the pans 65 are by this means given a vibratory motion toward and from the threshing-cylinder, and that the pans alternate in their movements, thereby balancing each other. Each of the pans is preferably provided at or near its rear end with two or more rack-bars 83, (see Figs. 1, 2, 23, and 24,) and each pan is also provided near its forward portion with a series of rack-bars 84, or "fish-backs," as they are generally called. The rack-bars 84 are preferably secured upon a plate 85, and this plate is pivotally connected to the walls of the pan at its rear end. We prefer to arrange the rack-bars with their forward ends substantially flush with the corresponding ends of the reciprocating pans beneath, so that the bundles of grain as they pass over the pans to the threshing-cylinder will be substantially upright and the cylinder-teeth will first engage the sides of the bundles, thus preventing all danger of clogging the cylinder, which sometimes happens when the bundles are discharged horizontally from the feed-pans and the cylinder-teeth engage the ends of the same. The plate is preferably located at some distance above the bottom of the pan, so that grain and chaff may pass under it. We prefer to provide an adjusting-screw 86 at each side of the pan for the purpose of adjusting the plate 85 and the racks carried thereby for controlling the draft of the cylinder. We also preferably provide the deflectors 87 at each side of the pan (see Figs. 1 and 2) for the purpose of causing the grain and chaff to pass the screws 86. The inner or lower edges of the pans rest upon the feed-board 88, (see Fig. 1,) and this feed-board is preferably held in position by clips 87′, which extend under the edge of the concave, as shown in Fig. 1. As the grain passes over the carrier it falls upon the vibrating pans 65 and is by them moved onward, and at the same time the bundles are thoroughly loosened and shaken up, so that the grain enters the threshing-machine in a thoroughly loose condition. As before stated, the outer ends of the pans are supported upon a crank-shaft 66, and this shaft is mounted in the brackets 71, that are keyed upon the shaft 68. When it is desired to obtain access to the cylinder or to the concave, the hook-bolts 72 are unhooked and the brackets 71 are swung backward into the position shown at the right in dotted lines in Fig. 1, and while in this position the brackets are engaged by the hooks 59, (see Fig. 1,) and the pans will now be free of the feed-board and may be swung around under the carrier into the position shown by the dotted lines at the right in Fig. 1 and at the left in Fig. 3. When the pans are in this position, access may be had to the concave or to the threshing-cylinder.

We provide also in connection with the machine a governor that controls automatically the carrier, and thereby controls the feed of grain to the knives and threshing-cylinder. The main portion of this governor is of the ordinary centrifugal type, and the governor-shaft is driven by a belt 90, extending from a pulley located on the shaft 40. The beater-cylinder, as before explained, is driven by a belt from the shaft of the knife-cylinder, and from the beater-cylinder the carrier is in turn driven. The vertical shaft of the governor is provided with the usual sliding stem, which is raised or lowered as the speed of the governor is increased or diminished. Mounted upon a base-plate 91 is a shaft 92, provided at one end with an arm 93, adapted to be raised by the sliding stem of the governor, and at the other end with a depending rod 94, having a hook or lug 95 at its lower end. A spiral spring 96 surrounds the shaft 92 and has one end secured thereto, while its opposite end is secured to an adjustable collar 97. (See Fig. 22.) This collar is adapted to be operated by means of a thumb-rod 98, upon the periphery of which a worm is provided which engages a worm upon the edge of the collar 97. By this means the tension of the spring 96 may be increased or diminished, thereby increasing or decreasing the tension necessary to bring the hook 95 on the rod 94 into engagement with a lug on the wheel 97′ on the beater-shaft. This wheel 97′ is provided with a notch adapted to be engaged by a pawl 99, mounted upon the frame of the machine. The wheel 97′ (see detail Figs. 12 and 13) is loose upon the beater-shaft, and said wheel has secured to or formed integrally with it the sprocket-wheel 100, from which extends a chain 101, that engages a sprocket-pinion 102, which is mounted upon a short shaft 103, said shaft carrying a pinion 104, that meshes with the pinion 105 on the shaft 37 of the carrier.

The shaft of the beater 55 carries a cross-head 106, (see Figs. 13 and 14,) having studs 107, upon which are mounted the rolls 108. Upon the disk 97′ there is pivoted a clutch-plate 109. (See Figs. 12 and 13.) A spring 110 engages this plate and tends to hold it normally in the position shown by full lines in Fig. 12. The plate 109 is also provided with the lugs 111 and 112, the lug 111 projecting laterally from the plate and the lug 112 projecting beyond the circumference of the disk 97′. The disk 97′ is also preferably provided with a counterweight 113. When the clutch-plate 109 is in the position shown by full lines in Fig. 12, the lug 111 thereon will be engaged by one of the wheels 108 upon the cross-heads 106, so that the disk 97′ will rotate with the shaft of the beater 55 and, through the means hereinbefore described, the carrier will be driven and the bundles of grain will be brought into the machine and under the knife-cylinder. When so much grain has entered the machine as to reduce the speed of the knife-cylinder, the speed of the governor will also be reduced and the rod 94 will be swung into the position shown by full lines in Fig. 3, thereby carrying the lug 95 on the end of this rod into the path of the lug 112 upon the clutch-plate 109. This will turn the clutch-plate from the position shown in Fig. 12 to the position shown in Fig. 13, and the cross-head 106 will now be out of engagement with the disk 97' and said disk will remain stationary, the dog 99 dropping into engagement with the notch in the edge of the disk, and the carrier will also remain stationary just as long as the disk 97' is stationary. When the lug on the end of the rod 94 is brought into engagement with the lug on the clutch-plate, the momentum of the disk 97' and parts secured thereby will be sufficient to overcome the tension of the spring 110 to such an extent as to permit the dog 99 to drop into the notch upon the edge of the disk 97', which prevents any backing up of the disk and parts connected therewith.

We also provide a device that we call a "strain-regulator," that is located upon the shaft of the knife-cylinder and between said shaft and the governor, which causes the speed of the governor to decrease upon the clogging of the knives. This device is shown in Figs. 3, 4, and 5 of the drawings. As before stated, the knife-cylinder, which is provided with the shaft 40 and with a loose driving-pulley 41, is driven from the threshing-cylinder by means of the belt 42. Upon this shaft 40 and at one side of the pulley 41 is a disk 114, having a hub which is keyed fast to the shaft 40. Loosely mounted upon this hub is a small pulley 115, formed integrally with which is the friction-ring 116. A strap 117 is pivoted on the disk 114 and is provided with a block or series of blocks 118, that engage the friction-ring 116. A spring 119 has one end bearing against the free end of the strap 117, the other end being supported by a lug 120 on the disk 114. An adjusting-screw 121 is provided in the lug 120 for increasing the tension of the spring 119. A slot 122 (see Fig. 3) is provided in the disk 114, and a stud 123, preferably formed upon or secured to one of the spokes of the pulley 41, extends through the slot 122, and the free end of the strap 117 is held against this stud by the spring 119. A lug 123' is arranged upon the side of the disk 114 next to the pulley, and a set-screw 121 in this stud is arranged to engage the stud 123. By this means the blocks 118 may be adjusted as said blocks wear. Clogging of the knives causes a compression of the spring 119 and releases the friction-blocks from the ring 116. This causes the speed of the governor to decrease, and thereby causes stoppage of the carrier, as already explained. As soon as the knives begin to run easier again the friction-blocks are thrown back into engagement with the ring 116. The governor is again started, or its speed is increased to normal, and the carrier then begins to operate. We have shown a single sprocket-wheel 102 upon the shaft 103 for transmitting movement from the shaft of the beater-cylinder to the carrier. In some instances, however, we may use means whereby without changing the speed of the beater a change may be obtained in the speed of the carrier. For this purpose we provide two sprockets 100 upon the shaft of the beater 55 and two chains 101, extending therefrom to two sprockets 102 upon the shaft 103. These sprockets are alike except that one is somewhat larger than the other. (See Figs. 18, 19, 20, and 21.) Each sprocket 102 is provided with recesses 124, and a sleeve 125 is keyed to the shaft 103 and is provided with lugs 126, which may be brought into engagement with the recesses in either of the sprockets 102. An operating-lever 127 may be arranged to engage the sleeve 125, thereby to move said sleeve so as to bring it into engagement with either of said sprocket-wheels, or it may be moved into position where it will not engage either wheel, in which case the carrier will remain stationary. The lever 127 may be provided with a handle of suitable construction, as shown in Figs. 20 and 21, and it may be arranged to move over a notched sector, and means may be provided for locking the lever in the position in which it is desired to have it remain.

An inclined lug 114' may be provided on the disk 114 (see Figs. 4 and 5) to keep the straw away from the spring 119.

In Figs. 23 and 24 we show a modified construction of the vibrating pans. In this instance the racks 84 are given a substantially vertical vibratory movement while partaking of the longitudinal vibratory movement of the pan. For this purpose we connect to the lower end of the arm 71 a bail 130, that extends beneath the pan and transversely thereof. (See Fig. 23.) A U-shaped rod 131 is pivotally connected to the plate 85, and its lower ends are screw-threaded. (See Fig. 24.) Clips 132 are arranged upon the bail 130, and they are provided with threaded openings or sockets that receive the threaded ends of the rods 131. A link 133 is connected to the bail 130, and the upper end of this link is provided with a hook that is adapted to engage any one of a series of holes in a plate 134, that is secured to the frame of the machine. As the pans and the racks carried thereby are reciprocated longitudinally the racks 84 are vibrated vertically, turning with the plate 85 about its pivotal point. By this means the material passing over the racks is given a more rapid shaking in its onward movement. By changing the adjustment of the link 131 the amount of vertical movement given to the racks 84 may be adjusted.

From the foregoing detailed description the operation of the device will be readily understood. The bundles which are placed on the carrier are brought into the machine and carried under the revolving knives. These knives cut the bands and at the same time tend to spread open the bundles. As the grain passes beyond the knives it comes in contact with the knife-guard 50, and the weight of this knife-guard resting upon the grain tends to more fully open up the bundles and spread the grain by retarding the tops of the bundles, while the lower portions thereof are carried forward by the spikes of the carrier-apron beneath. The grain then passes under the beater 55, which also assists in spreading the grain, and passing under the fenders 58 it falls upon the reciprocating pans, by which it is fed to the threshing-cylinder. By the means already described the machine is rendered automatically adjustable. Should too much grain be fed to the machine at one time, the movement of the carrier would be decreased or entirely stopped until the bundles beneath the knives have been properly cut and the grain moved onward to the threshing-cylinder.

It will be seen that the machine is exceedingly simple in construction and that all of its parts may be made in the most durable manner. At the same time it will be noticed that many of the details of construction herein shown and described may be varied without departing from our invention. Hence we do not limit ourselves to the details of the construction shown and described.

Having thus described our invention, we claim as new and desire to secure by Letters Patent—

1. The combination, with a knife-cylinder and knives, of a knife-guard consisting of a pivoted triangular frame having its pivotally-supported apex on that side of the frame next to the cylinder and said frame lying wholly in the rear of the knife-cylinder and movable independently thereof and adapted to rest by gravity upon the grain to spread the bundles as they leave the cylinder, substantially as described.

2. The combination, with the knife-cylinder and knives, of the knife-guard 50 consisting of the triangular frame pivotally supported and lying wholly in the rear of the knife-cylinder and having its apex on that side of the frame next to the cylinder and movable independently thereof and provided with openings through which the knives pass on their upstroke only, and means for securing said knife-guard in any desired position.

3. The combination, with the knife-cylinder and knives, of the knife-guard consisting of the triangular frame pivotally supported in the rear of the knife-cylinder and provided in the lower part of the triangle with openings extending therethrough to prevent the straw from lodging on said frame, and means for securing said knife-guard in any desired position, for the purpose set forth.

4. The combination, with a rotating beater, of a series of fenders supported on a common center with said beater and adapted to describe a partial revolution about the same, said fenders being at all points of their travel a uniform distance from said beater and adjustable independently of the same, substantially as described.

5. The combination, with a beater 55, of a series of fenders 58 extending beneath said beater and adjustable independently of the same and at all points of their adjustment a uniform distance from said beater, and a yielding connection for said fenders, substantially as described.

6. The combination, with a beater 55, of pivoted brackets 56, a transverse bar 57 provided on said brackets, a series of fenders 58 secured at intervals on said bar and extending beneath said beater, and a suitable adjusting device provided in connection with said bar, whereby the position of said fenders may be changed with respect to the beater and knife-cylinder, and said fenders being at all points of their adjustment a uniform distance from said beater, substantially as described.

7. The combination, with the beater 55, of the pivoted brackets 56, the transverse bar 57, the series of fenders 58 secured to said bar and extending beneath said beater, the adjusting-bar 61 and a spring connection between the transverse bar 57 and said adjusting-bar, for the purpose set forth.

8. The combination, with a knife-cylinder shaft, of a pulley 41 loosely mounted thereon, a spring-controlled clutch device secured on said shaft, a pulley 115 also loosely mounted on said shaft and normally locked thereon by said clutch, means provided on said pulley 41 for normally engaging said clutch and disengaging the same from said pulley 115 when the knives become clogged and the cylinder falls below the desired speed, a centrifugal governor connected with said pulley 115 and controlled by the speed of said cylinder, a carrier, and suitable operative connections provided between said governor and carrier whereby the operation of the latter is controlled by the speed of the former.

9. The combination, with a knife-cylinder shaft, of a pulley 41 loosely mounted thereon, a disk secured on said shaft, a pulley 115 loosely mounted upon said shaft and provided with a friction-ring, a centrifugal governor connected with said pulley 115 and driven thereby, a carrier, means connecting said governor and carrier whereby the movement of the latter is controlled by the speed of the former, a clutch device mounted on said disk and normally engaging said friction-ring to lock said pulley 115 and operate said governor, and means provided in connection with said pulley 41 and normally engaging said clutch device and adapted to disengage the same from said ring to stop said governor and carrier when the knives become clogged and the speed of the cylinder falls below the desired limit, substantially as described.

10. The combination, with a knife-cylinder shaft and a pulley 41 loosely mounted thereon, of a disk secured on said shaft, a pulley 115 loosely mounted on said shaft and provided with a friction-ring, a centrifugal governor driven from said pulley 115 and adapted to control the movement of a bundle-carrier, a clutch device mounted on said disk and having spring-controlled blocks normally engaging said friction-ring for locking said pulley 115 and driving said governor, and means provided on said pulley 41 for normally engaging said clutch device and operating the same to release said pulley 115 and stop said governor and carrier when the cylinder becomes clogged and its speed falls below the desired limit, substantially as described.

11. The combination, with the knife-cylinder and knives, of a pivoted knife-guard comprising a cross-bar, a series of A-shaped parts secured thereon, slots or spaces being provided between said A-shaped parts to receive the knives, the slots in the lower section or leg of the A-shaped sections extending entirely through the same to prevent the straw from lodging therein, and means for adjusting said knife-guard upon its pivots, substantially as described.

12. The combination, with the longitudinally-vibrating pans, of the swinging brackets 71, the crank-shaft mounted in said brackets and connected to said pans, the bail connected with said brackets and extending beneath said pans, connections between said bail and said pans and an adjustable link connected to said bail, for the purpose set forth.

13. The combination, with the vibrating pans provided with the pivoted plate 85, of the bail 130, the adjustable link 133 connected to said bail and the rods 131 connected to said plate and to said bail.

14. The combination, with the knife-cylinder, of the brackets secured thereon and each provided with a vertical flange, a series of knives secured to said flanges, a series of shields 49 extending lengthwise of said cylinder in front of said knives and projecting out beyond said brackets to prevent the straw from lodging thereon, substantially as described.

15. The combination, with a knife-cylinder and knives, of the knife-guard provided with recesses through which the knives of the cylinder pass, the forward end of said guard being pivoted in the rear of and near said cylinder, whereby the knives enter said recesses during their upstroke only, and the rear portion of said guard being adapted to rest upon and spread the bundles of grain as they leave the knife-cylinder, substantially as described.

16. The combination, with the knife-cylinder and knives, of a knife-guard comprising a triangular frame having a series of transverse openings or slots, those in the lower leg or section of the frame extending entirely through the same to receive the knives and permit the straw to be cleaned therefrom before the knives enter the slots in the upper section or leg of said frame, substantially as described.

17. The combination, with the knife-cylinder and knives, of the pivoted triangular knife-guard, comprising the cross-bar 52, the series of A-shaped parts secured thereon, slots or spaces being provided between said A-shaped parts to receive the knives the slots in the lower section or leg of the A-shaped sections extending entirely through the same to prevent the straw from lodging therein, substantially as described.

18. The combination, with the knife-cylinder and knives, of the knife-guard comprising a triangular frame pivoted in the rear of said knife-cylinder and having slots or recesses to receive the knives, the journals of said frame being near its apex to permit the lower leg thereof to rest upon and spread the bundles of grain as they leave the knife-cylinder, substantially as described.

19. The combination, with the knife-cylinder and knives, of the pivoted triangular knife-guard, comprising the cross-bar 52, the A-shaped sections having their upper legs secured at intervals on said bar, the spaces between said A-shaped sections being adapted to receive the knives as the cylinder revolves, and the lower legs of said sections being adapted to clear the knives of straw to prevent its being thrown against and lodging upon said cross-bar as the knives pass between the upper legs of said sections, substantially as described.

20. The combination, with the knife-cylinder, of the carrier-frame and the carrier thereon, said frame being divided into three sections, the inner section being pivotally supported at its inner end beneath the knife-cylinder, means adjustably supporting said section at its outer end on the frame of the machine, and the intermediate section pivotally connected to the outer end of said inner section, substantially as described.

21. The combination, with the frame 5, of the brackets 26 and 27 thereon, the carrier-frame consisting of several sections pivoted together, the inner section having studs at its inner end pivotally supported in said brackets 26 and means adjustably supporting said inner section at its outer end in said brackets 27, for the purpose specified.

22. The combination, with a beater, of brackets 56 pivoted concentric with the axis of said beater, a transverse bar 57 supported on said brackets, a series of curved fenders 58 arranged at intervals upon said bar and extending beneath said beater to a point near the threshing-cylinder, means for adjusting said bar to change the position of said fenders with respect to said cylinder and the concentric pivots of said brackets permitting said fenders to be adjusted in different positions without varying their distance from said beater, substantially as described.

23. The combination, with a knife-cylinder shaft, of a pulley 41 loosely mounted thereon, a disk secured on said shaft, a pulley 115 loosely mounted on said shaft and having a suitable friction-ring, a centrifugal governor driven from said pulley 115 and connected with the bundle-carrier and controlling the movement of the same, a strap pivoted on said disk and provided with a series of blocks normally held in engagement with said ring with a yielding pressure, and means provided on said pulley 41 and normally engaging said strap and adapted to disengage said blocks from said ring and release said pulley 115 when the knives become clogged and the speed of the cylinder falls below the desired limit, substantially as described.

24. The combination, with a knife-cylinder shaft, of a pulley 41 loosely mounted thereon, a disk 114 secured on said shaft, a pulley 115 loosely mounted on said shaft and provided with a suitable friction-ring, a centrifugal governor connected with said pulley 115 and driven thereby, a carrier, suitable connections provided between said governor and carrier whereby the movement of the latter is controlled by the speed of the former, a spring-actuated strap pivoted on said disk and having blocks normally in engagement with said ring, and a pin provided on said pulley 41 and normally engaging said strap and adapted to disengage said blocks from said ring and release said pulley 115 and stop said governor and carrier when the knives become clogged and the speed of the cylinder falls below a certain predetermined limit, substantially as described.

25. The combination, with a beater-shaft, of a disk loosely mounted thereon, a carrier-shaft connected with said disk to be driven thereby, a cross-head secured on said beater-shaft, a spring-controlled clutch-plate 109 pivoted on said disk and normally in engagement with said cross-head, whereby said disk will be locked on said shaft and said carrier-shaft will be operated simultaneously with said beater-shaft, a centrifugal governor controlled by the speed of the knife-cylinder, a hooked rod 94 connected with said governor and operated by the raising of the governor-stem to engage said clutch-plate and throw it out of engagement with said cross-head and stop the carrier, when the speed of said governor falls below the desired limit, substantially as described.

26. The combination, with a beater-shaft, of a disk loosely mounted thereon, a carrier-shaft provided near said disk and operatively connected therewith, a cross-head secured on said beater-shaft, a spring-controlled clutch-plate 109 pivoted on said disk and having a lug normally in engagement with said cross-head whereby said disk will be locked on said beater-shaft and said carrier-shaft will be operated, a centrifugal governor connected with the knife-cylinder and controlled by the speed of the same, a swinging hooked rod 94 connected with said governor and adapted to be operated as the governor-stem is raised to engage and operate said clutch-plate to disengage said lug from said cross-head when the speed of the governor falls below the desired limit, substantially as described.

27. The combination, with a knife-cylinder shaft, of a pulley 41 loosely mounted thereon, a spring-controlled clutch device secured on said shaft, a pulley 115 also loosely mounted on said shaft and normally locked thereon by said clutch, means provided on said pulley 41 for normally engaging said clutch and disengaging the same from said pulley 115 when the knives become clogged and the cylinder falls below the desired speed, a centrifugal governor connected with said pulley 115 and controlled thereby, a spring-controlled rock-shaft 92 mounted near said governor and adapted to be rocked against the tension of its spring by the ascent of the governor-stem, a hooked rod 94 mounted on said shaft and swung by the rocking of the same, a carrier and a spring-controlled clutch device provided in connection with said carrier and adapted to be engaged and operated by said hooked rod to stop the carrier when the speed of the governor falls below the desired limit, substantially as described.

28. The combination, with the castings 69 having the lugs 70, of the shaft 68 mounted in bearings in said castings, the brackets 71 secured upon said shaft 68, the hook-bolts 72 securing said brackets to said lugs, the crank-shaft 66 mounted in said brackets and the vibrating pans mounted on said shaft 66, substantially as described.

29. In a machine of the class described, the combination, with vibrating pans, of plates horizontally arranged therein and spaced from the bottom of the same and having their forward ends near the forward ends of said pans, rack-bars arranged upon said plates, the forward ends of said rack-bars being above and near the forward ends of said pans, whereby the bundles of grain will drop down between the bars and tip over the ends of the plates and pans to a substantially vertical position where the cylinder-teeth will first engage the sides of the bundles and clogging of the cylinder will be prevented, substantially as described.

30. In a machine of the class described, the combination, with vibrating pans, of plates 85 pivotally supported therein and having their forward ends near the forward ends of said pans, rack-bars arranged upon said plates, the forward ends of said rack-bars projecting over the ends of said plates and above and opposite the forward ends of said pans, whereby the bundles of grain will drop down between the bars and tip over the ends of the plates and pans to a substantially vertical position where their sides will be engaged first by the teeth of the cylinder and clogging of the same prevented, substantially as described.

31. In a machine of the class described, the combination, with vibrating pans, of pivoted plates 85 supported thereon and having their forward ends near the forward ends of said pans, means for adjusting said plates vertically, a series of rack-bars arranged upon said plates and having their forward ends overlapping the same and opposite the forward ends of said pans, whereby the bundles of grain will drop down between the bars and be tipped over the ends of the plates and pans to a substantially vertical position where the teeth of the cylinder will first engage the sides of the bundles and clogging of the cylinder will be prevented.

32. The combination, with a threshing-cylinder and feed-board, of longitudinally and vertically reciprocating pans, rack-bars pivotally supported thereon and having a vertical vibratory movement on their pivots, the forward ends of said bars being above and substantially flush with the corresponding ends of said pans and adapted to tilt the bundles of grain up to a vertical position over the ends of said pans, whereby the bundles when delivered to the cylinder will be in a substantially vertical position and the teeth of the cylinder will first engage the sides of the bundles.

In testimony whereof we hereunto set our hands this 15th day of April, 1899.

CHAUNCY H. HILL.
ROBERT R. HOWELL.

In presence of—
  SAM. BRIGANCE,
  RICHARD PAUL.